(12) United States Patent
Archambault et al.

(10) Patent No.: US 7,555,748 B2
(45) Date of Patent: *Jun. 30, 2009

(54) METHOD AND APPARATUS FOR IMPROVING DATA CACHE PERFORMANCE USING INTER-PROCEDURAL STRENGTH REDUCTION OF GLOBAL OBJECTS

(75) Inventors: Roch Georges Archambault, North York (CA); Shimin Cui, Toronto (CA); Yaoqing Gao, North York (CA); Raul Esteban Silvera, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 716 days.

This patent is subject to a terminal disclaimer.

(21) Appl. No.: 10/930,037

(22) Filed: Aug. 30, 2004

(65) Prior Publication Data

US 2006/0048103 A1      Mar. 2, 2006

(51) Int. Cl.
*G06F 9/45* (2006.01)
(52) U.S. Cl. .............. 717/158; 717/144; 717/146
(58) Field of Classification Search .............. None
See application file for complete search history.

(56) References Cited

U.S. PATENT DOCUMENTS

| | | | |
|---|---|---|---|
| 5,768,596 A | 6/1998 | Chow et al. | 395/709 |
| 5,812,855 A * | 9/1998 | Hiranandani et al. | 717/157 |
| 5,850,549 A * | 12/1998 | Blainey et al. | 717/156 |
| 6,059,839 A * | 5/2000 | Dehnert et al. | 717/154 |
| 6,131,189 A | 10/2000 | Chow et al. | 717/9 |
| 6,286,135 B1 * | 9/2001 | Santhanam | 717/146 |
| 6,675,368 B2 | 1/2004 | Takayanagi et al. | |
| 6,675,378 B1 * | 1/2004 | Schmidt | 717/154 |
| 6,738,967 B1 * | 5/2004 | Radigan | 717/146 |
| 2002/0010911 A1 * | 1/2002 | Cheng et al. | 717/4 |
| 2002/0162096 A1 * | 10/2002 | Robison | 717/145 |
| 2002/0184615 A1 * | 12/2002 | Sumner et al. | 717/130 |
| 2003/0177472 A1 * | 9/2003 | de Jong | 717/110 |

OTHER PUBLICATIONS

Ki-Il Kum, Jiyang Kang, Wony ong Sung, AutoScaler For C: An Optimzing Floatin-Point to Integer C Program Converter For Fixed-Point Digital Signal Processors, 2000, IEEE, vol. 47, pp. 840-848.*

Greenwald, "A Technique for Compilation to Exposed Memory Hierarchy", Massachusetts Institute of Technology, 1999, pp. 1-56.

(Continued)

*Primary Examiner*—Tuan Q Dam
*Assistant Examiner*—Hanh T Bui
(74) *Attorney, Agent, or Firm*—Yee & Associates, P.C.; Jill A. Poimboeuf

(57) ABSTRACT

Inter-procedural strength reduction is provided by a mechanism of the present invention to improve data cache performance. During a forward pass, the present invention collects information of global variables and analyzes the usage pattern of global objects to select candidate computations for optimization. During a backward pass, the present invention remaps global objects into smaller size new global objects and generates more cache efficient code by replacing candidate computations with indirect or indexed reference of smaller global objects and inserting store operations to the new global objects for each computation that references the candidate global objects.

3 Claims, 9 Drawing Sheets

OTHER PUBLICATIONS

Amarasinghe et al., "Strength Reduction of Integer Division and Modulo Operations", MIT Laboratory for Computer Science, MIT-LCS-TM-600, LCS Category: Computer Architecture, Nov. 1, 1999, pp. 1-17.

Cooper et al., "An Efficient Static Analysis Algorithm to Detect Redundant Memory Operations", Memory System Performance, Proceedings of the Workshop on Memory System Performance, Berlin, Germany, pp. 1-12, 2003.

Banning, "An Efficient Way to Find the Side Effects of Procedure Calls and the Aliases of Variables", Annual Symposium on Principles of Programming Languages, Proceedings of the 6th ACM SIGACT-SIGPLAN Symposium on Principles of Programming Languages, San Antonio, Texas, pp. 29-41, 1979.

Cytron et al., "Efficient Accommodation of May-Alias Information In SSA Form", ACM-SIGPLAN-PLDI-6/93/Albuquerque, New Mexico, 1993, pp. 36-45.

Choi et al., "Efficient Flow-Sensitive Interprocedural Computation of Pointer-Induced Aliases and Side Effects", Annual Symposium on Principles of Programming Languages, Proceedings of the 20th ACM SIGPLAN-SIGACT Symposium on Principles of Programming Languages, Charleston, South Carolina, pp. 232-245, 1993.

Cooper et al., "Interprocedural Side-Effect Analysis In Linear Time", Proceedings of the SIGPLAN '88 Conference on Programming Language Design and Implementation, Atlanta, GA Jun. 1988, pp. 57-66.

Burke, "An Interval-Based Approach to Exhaustive and Incremental Interprocedural Data-Flow Analysis", ACM Transactions on Programming Languages and Systems, vol. 12, No. 3, Jul. 1990, pp. 341-395.

Hind et al., "Interprocedural Pointer Alias Analysis", ACM Transactions on Programming Languages and Systems, vol. 21, No. 4, Jul. 1999, pp. 848-894.

Archambault et al., Method and Apparatus for Optimizing Software Program Using Inter-Procedural Strength Reduction.

Bentley, Rules for Code Tuning (Appendix 4 of Programming Pearls), 2000, Addison-Wesley Inc., Second Edition, pp. 1-6, Retrieved Aug. 21, 2008. http://www.cs.bell-labs.com/cm/cs/pearls/index.html.

* cited by examiner

ANALYZE COLLECTED INFORMATION

FIG. 8A
BACKWARD PASS

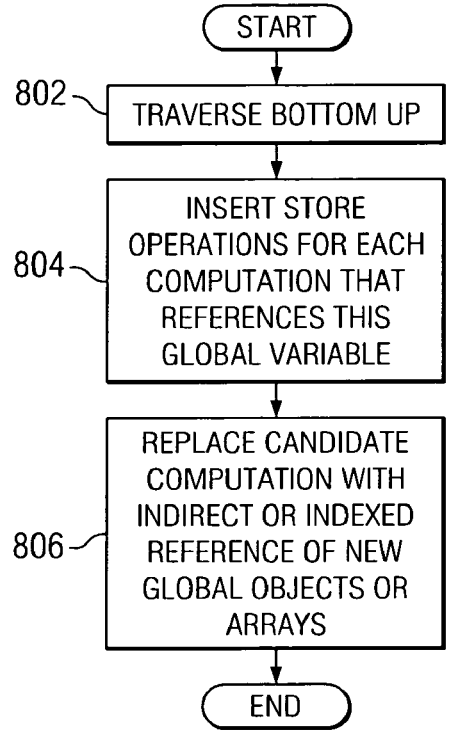

- 802 — TRAVERSE BOTTOM UP
- 804 — INSERT STORE OPERATIONS FOR EACH COMPUTATION THAT REFERENCES THIS GLOBAL VARIABLE
- 806 — REPLACE CANDIDATE COMPUTATION WITH INDIRECT OR INDEXED REFERENCE OF NEW GLOBAL OBJECTS OR ARRAYS

FIG. 9

```
902 { float **a;
      int b[M] [N] ;

int bar() {
908     a = malloc (sizeof (float*) *M) ;
        for (i = 0 ; i < M; i++) {
910       a[i] = malloc (sizeof (float) *N) ;
        }
        ...
      } int foo() {
        ...
        for (i = 0 ; i < M; i++) {
          for (j = 0 ; j < N; j++) {
912         916
            if (Fa(a[i] [j]) > 1) {
              x += I;
            }
            y += Fb(b[i] [j]) %256;
            ...
          }        918  914
          ...
        }
        ...
      }
```

FIG. 10

```
       float **a;                              1000
       int b[M] [N] ;
1002   bool **isra; ⟋1008
       char isrb[M] [N] ; ⟋1010 int bar()  {
          a = malloc (sizeof (float*) *M) ;
          isra = malloc (sizeof (bool*) *M) ; ⟋1014
          for (i = 0 ; i < M; i++) {
1004        a[i] = malloc (sizeof (float) *N) ;
            isra[i] = malloc (sizeof (bool) *N) ⟋1016
          }
          ...
       } int foo() {
          ...
          for (i = 0 ; i < M; i++) {
             for (j = 0 ; j < N; j++) {
       1018 ⟋ if (isra[i] [j]) {
                   x += 1;
1006             }
       1020 ⟋ y += isrb[i] [j]) ;
             ...
             }
             ...
          }
          ...
       }
```

FIG. 11

```
float **a;                    1100 int b[M] [N] ;
bool **isra;
char isrb[M] [N] ;

int bar()  {
   a = malloc (sizeof (float*) *M) ;
   isra = malloc (sizeof (bool*) *M) ;
   for (i = 0 ; i < M; i++) {
      a[i] = malloc (sizeof (float) *N) ;
      isra[i] = malloc (sizeof (bool) *N);
   }
   ...
} int foo() {
   ...
   for (i = 0 ; i < M; i++) {
      for (j = 0 ; j < N; j++) {
         x += isra[i] [j] ;
1102     y += isrb[i] [j] ;
         ...
      }
      ...
   }
   ...
}
```

METHOD AND APPARATUS FOR IMPROVING DATA CACHE PERFORMANCE USING INTER-PROCEDURAL STRENGTH REDUCTION OF GLOBAL OBJECTS

CROSS REFERENCE TO RELATED APPLICATION

The present invention is related to an application entitled Method and Apparatus for Optimizing software Program using Inter-Procedural Strength Reduction, attorney docket no. CA920040084US1, filed even date hereof, assigned to the same assignee, and incorporated herein by reference.

BACKGROUND OF THE INVENTION

1. Technical Field

The present invention relates to an improved data processing system. In particular, the present invention relates to improving data cache performance of a data processing system. Still more particularly, the present invention relates to improving data cache performance of a data processing system using inter-procedural strength reduction of global objects.

2. Description of Related Art

In a data processing system, data cache is part of the cache memory that interfaces between the processor and the main memory. Each time a piece of data, such as value of a variable, is requested, the processor attempts to locate the data in the data cache, prior to performing a look up in the main memory. Thus, the data cache stores data that is most frequently retrieved by the processor.

However, as the speed of the processor increases, the data random access memory (DRAM) or data cache latency also increases, since the processor can process requests much faster than the DRAM can handle. This makes improving data cache performance a priority for modern compiler design.

Two major types of approach have been introduced to optimize global data locality, which in turn improves data cache performance. One approach is using code transformations, which exploit spatial locality. This approach is performed during the code optimization phase of the compiler. Common code transformations include loop tiling, strip mining, and loop interchange. Another approach is using data layout transformations, which exploit data re-use. Common layout transformations include array padding and data reconstruction.

As mentioned in related patent application entitled "METHOD AND APPARATUS FOR OPTIMIZING SOFTWARE PROGRAM USING INTER-PROCEDURAL STRENGTH REDUCTION", herein incorporated by reference, costly computations may be identified and replaced with less costly computations. In turn, the total number of computations in a software program is reduced inter-procedurally and the performance of the software program is enhanced.

However, a need exists for a solution that improves data cache utility with a given inter-procedural view of a program. Therefore, it would be advantageous to have an improved method and apparatus that can analyze the usage pattern of global objects in a software program and identifies opportunities for object compression, such that more cache efficient code may be generated.

SUMMARY OF THE INVENTION

A method, apparatus and computer instructions is provided for improving data cache performance using inter-procedural strength reduction of global objects. The mechanism of the present invention analyzes the usage pattern of global objects in a source program using information collected during a forward pass and determines if global objects can be mapped to smaller size global objects. Once candidate computations are identified, the mechanism of the present invention modifies intermediate representation of the source program during a backward pass to replace candidate computations with indirect or indexed reference of smaller size new global objects and to insert store operations to the new global objects for each computation that references the candidate global variables.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8A is a flowchart of a process for modifying intermediate representation of code during backward pass in accordance with a preferred embodiment of the present invention;

FIG. 9 is a diagram illustrating an exemplary software program prior to optimization using inter-procedural strength reduction in accordance with a preferred embodiment of the present invention;

FIG. 10 is a diagram illustrating an exemplary software program after optimization using inter-procedural strength reduction in accordance with a preferred embodiment of the present invention; and FIG. 11 is a diagram illustrating an exemplary software program after further optimization using inter-procedural strength reduction in accordance with a preferred embodiment of the present invention.

DETAILED DESCRIPTION OF THE PREFERRED EMBODIMENT

Figure 1:
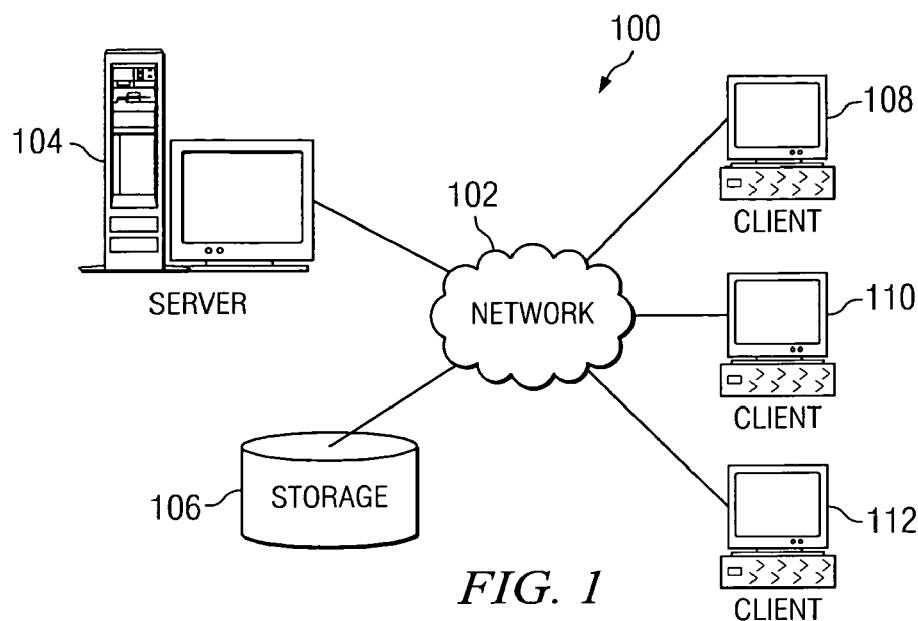
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
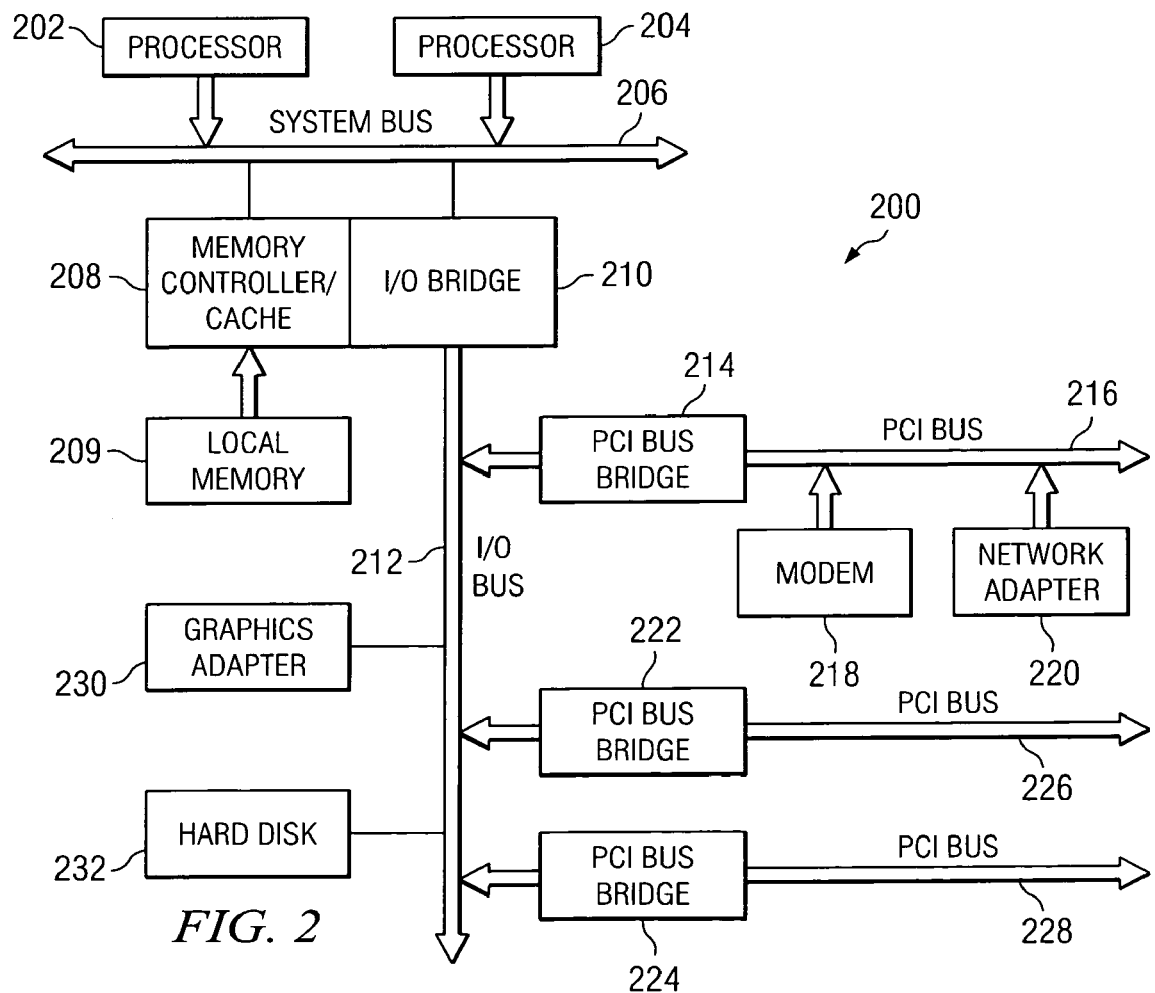
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX®) operating system or LINUX™ operating system.

IBM, eServer, Pseries and AIX are trademarks or registered trademarks of International Business Machines Corporation. LINUX is a trademark of Linus Torvalds.

Figure 3:
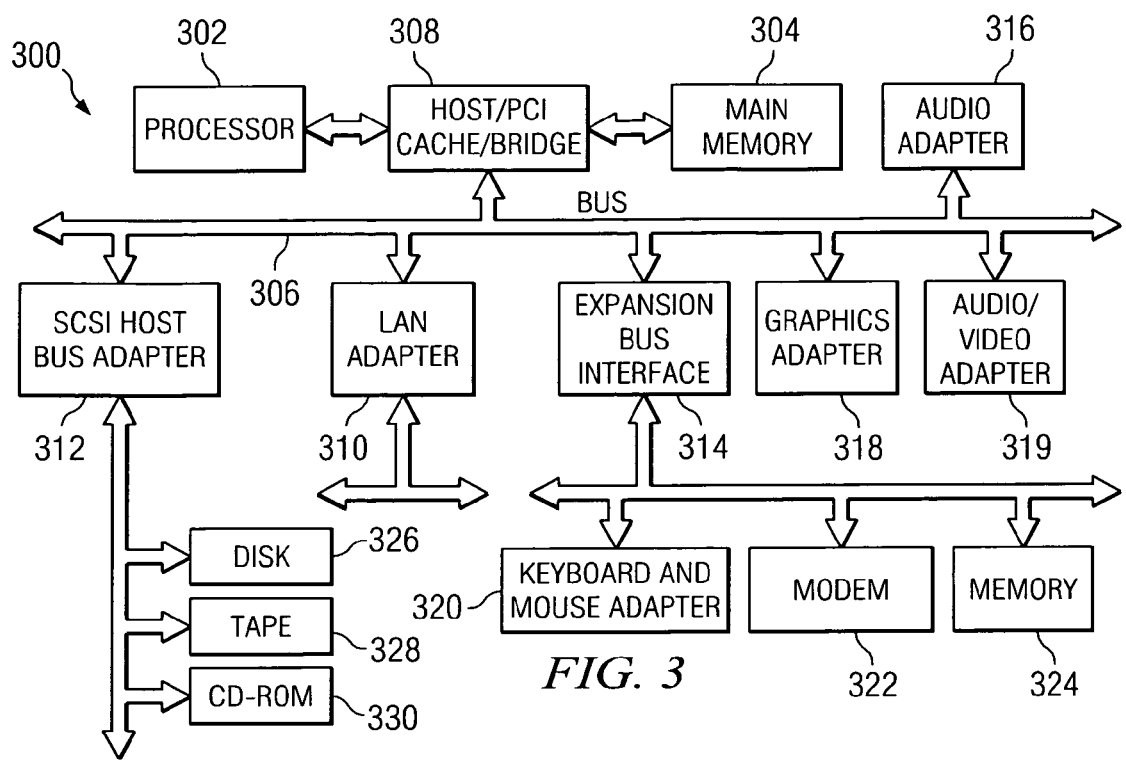
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows™ XP, which is available from Microsoft Corporation. Windows is a trademark of Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus and computer instructions for improving data cache performance using inter-procedural strength reduction of global objects. The mechanism of the present invention reduces the size of global objects repeatedly referenced in loops of a software program by compressing or pre-computing global objects. Global objects include global dynamic objects and global arrays.

Object compression reduces cache consumption in hot spot and increases the effective cache block size and effective cache capacity. Pre-computation reduces computation cost in strength by taking advantages of processor specific hardware.

The mechanism of the present invention performs a two-pass analysis. The two-pass analysis includes traversing intermediate representation of a software program during a forward pass to collect information. Intermediate representation includes a call graph, a control flow graph, and a data flow graph. Other types of intermediate representation may also be used.

During the forward pass, the mechanism of the present invention traverses the call graph in reverse depth-first or top-down order to collect definition and use information of global variables in the software program. Definition information keeps track of stores of all global variables in the program. Use information keeps track of costly computations that are candidates for cost pre-computation.

In addition, the mechanism of the present invention analyzes aliases of global objects using escape analysis and identifies candidate global objects for object compression or pre-computation. Escape analysis is a technique that can be used to determine aliases of global objects, i.e., to determine if two global objects may refer to the same location in memory. Any object passed as an argument or a return value escapes by definition. When an object escapes, it means that it has been exposed outside of the current procedure. If precise aliases of a global object can be determined, the global object may be a candidate for object compression. The candidate global objects are listed using a bit vector. The candidate list is refined during traversal of the call graph and finalized at the end of the traversal.

When candidate global objects are identified, the mechanism of the present invention adds a tree entry representing the computation referencing the global objects to the use list. The indices of the global object are excluded, since they may operate on a local variable and are not needed. In addition to the tree computation, all levels of indirect reference symbols are also added to the use list if the global variable referenced in the candidate computation is a global dynamic object. If the global variable referenced is a global array, the mechanism of the present invention adds the indexed reference symbol to the def list.

Once candidate global objects are identified and the definition and use information is collected, the mechanism of the present invention analyzes the information at the end of the forward pass after all nodes in the call graph have been traversed. This analysis includes finalizing candidate global objects for object compression or pre-computation based on finalized alias information and identifying candidate computations for strength reduction based on cost analysis of the whole program.

A computation may be determined to be a candidate for object compression if the computation only contains global objects, in which indices of the referenced global objects can contain local variables. A candidate computation may also be determined as a candidate for object compression if and only if the computation can be mapped to a simple loading of an object of smaller size data type.

As to candidate computations for optimization, pre-computation of a computation may be beneficial, for example, if the total cost of pre-computation is much lower than the current computation cost. The total cost of pre-computation is determined by two factors, the execution counts for both the computations and the reaching definition, and the total size of the referenced global variables if the global variables are dynamic objects or arrays.

After candidate computations are identified, the mechanism of the present invention creates new global variables. The number of global variables depends on the number of levels of indirect or indexed reference of the global variables in the computation. The new global variable for the highest level of indirect reference has the type of the smallest or smaller size capable of holding the range of values of the computation depending on the architecture. New symbols are also generated for the aliased objects of the global variables. The relationship among aliased objects is also recorded for alias analysis.

After new global variables are created, the mechanism of the present invention modifies the intermediate representation of the code being compiled during a backward pass. During the backward pass, the mechanism of the present invention traverses the call graph of the intermediate representation in a depth-first or bottom-up order.

The mechanism of the present invention modifies the intermediate representation by replacing all occurrences of candidate computations by an indirect or indexed reference of the new global dynamic objects or arrays. As to candidate global objects, the mechanism of the present invention inserts a store operation to new global variables for each computation that references the candidate global object at all of its definition points where the base symbol, its indirect or indexed reference symbol, or its alias symbol is defined in the software program.

Thus, the present invention provides an inter-procedural strength reduction method that improves performance of data cache. The present invention pre-computes a total cost of pre-computation in a source program and determines if computations are candidates for optimization. The present invention then inter-procedurally replaces candidate computations with indirect reference of new global objects or indexed reference of new global arrays, such that the size of global objects repeatedly referenced in the loops of the software program is reduced.

Figure 4:
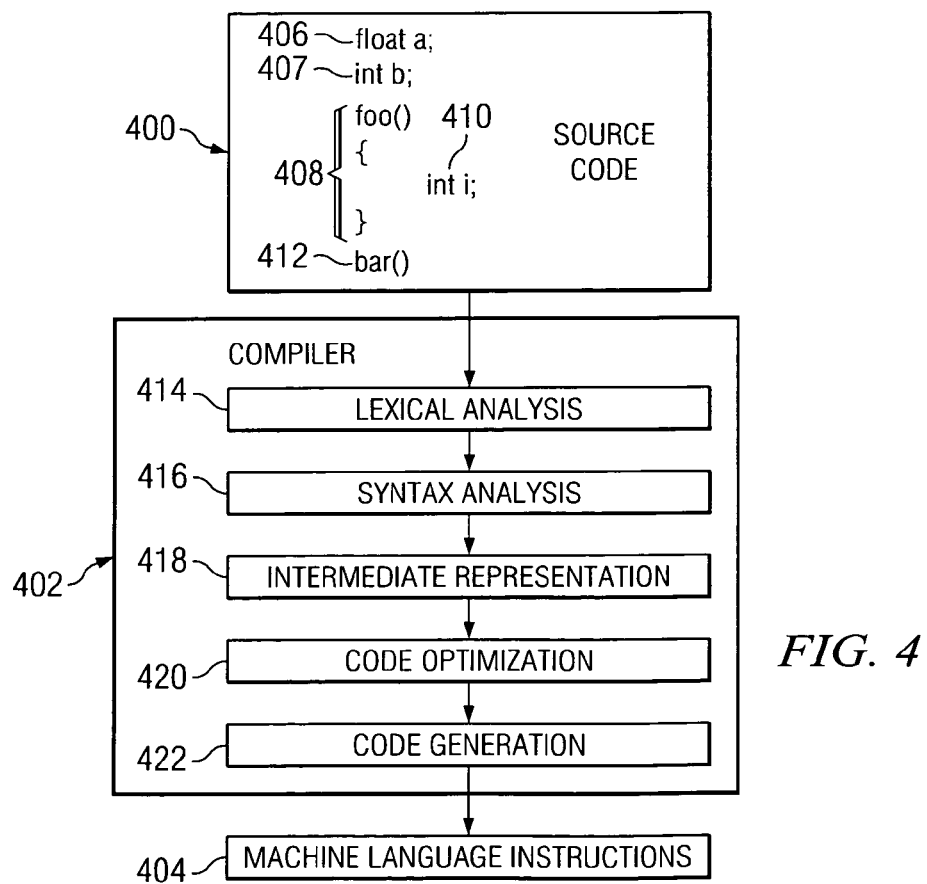
FIG. 4 is a diagram illustrating relationships between a source program, a compiler, and machine language instructions in a preferred embodiment of the present invention.

Turning now to FIG. 4, a diagram illustrating relationships between a source program, a compiler, and machine language instructions is depicted in a preferred embodiment of the present invention. As illustrated in FIG. 4, in this illustrative example, a user, such as a programmer, may define source program 400. Source program 400 includes variables and procedures.

Variables may be global or local. Global variables are accessible by any procedure within source program 400. In this example, variable a 406 is defined as a float and variable b 407 is defined as an integer. Variable a 406 and variable b 407 are both accessible by procedure foo 408 and procedure bar 412. Within a procedure, local variables may be present. In this example, variable i 410 is defined as an integer in procedure foo 408 and is only accessible within procedure foo 408.

Once source program 400 is defined, a programmer may compile source program 400 using compiler 402. Compiler 402 may be implemented in a data processing system, such as data processing system 200 in FIG. 2 or data processing system 300 in FIG. 3. In the compilation process, compiler 402 processes source program 400 in several phases: lexical analysis phase 414, syntax analysis phase 416, intermediate representation phase 418, code optimization phase 420, and code generation phase 422.

Lexical analysis phase 414 analyzes source program 400. In this phase, compiler 402 reads characters in source program 400 and groups them into streams of tokens representing logically cohesive sequence of characters, such as identifiers, operators and keywords.

Syntax analysis 416 imposes a hierarchy structure on the token string. During syntax analysis 416, compiler 402 obtains the string of tokens from lexical analysis 414 and determines whether the string is a valid construct of the source language by either performs top-down parsing or bottom-up parsing.

Once lexical and syntax analysis is complete, compiler 402 generates an explicit intermediate code representation 418 of source program 400, which may take a variety of forms. For example, an intermediate code representation may be a call graph, a data flow graph or a control flow graph. In a preferred embodiment, the mechanism of the present invention performs a two-pass traversal of a call graph generated by compiler 402. However, other intermediate representation may also be used.

In code optimization phase 420, compiler 402 performs various transformations in order to improve intermediate code. These transformations include loop transformations, such as, loop tiling or strip mining. These transformations improve performance of the target machine code.

Finally, compiler 402 generates target machine code by selecting memory locations for each variable used by the program. Each intermediate instruction is translated into a sequence of machine language instructions, such as machine language instructions 404 that performs the same task. Machine language instructions 404 may be for a specific platform, such as, a UNIX® platform. UNIX is a registered trademark of The Open Group. A programmer may then execute these instructions on the specific platform with improved performance.

Figure 5:
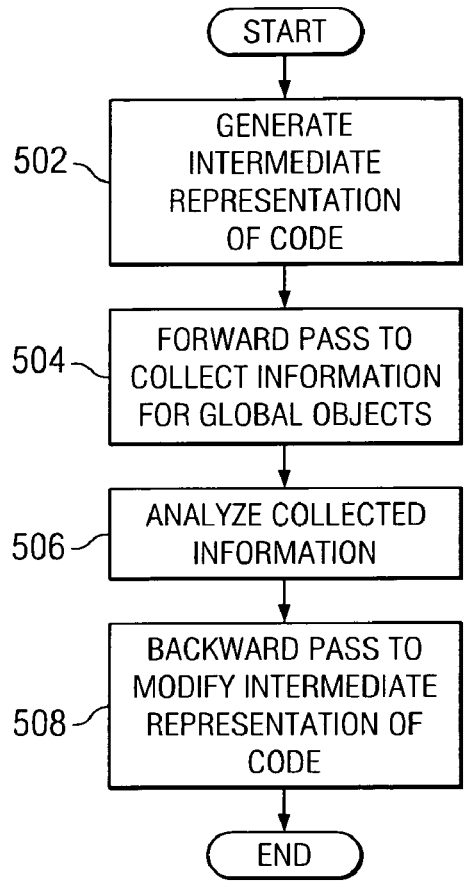
FIG. 5 is a flowchart of a process for optimizing software program using inter-procedural strength reduction in accordance with a preferred embodiment of the present invention.

Turning now to FIG. 5, a flowchart of a process for optimizing software program using inter-procedural strength reduction is depicted in accordance with a preferred embodiment of the present invention. The process begins when the compiler, such as compiler 402 in FIG. 4, generates an intermediate code representation of the source program (step 502). The intermediate representation generated may be a call graph, a control flow graph or a data flow graph.

Next, the mechanism of the present invention collects information including use and definition information of global variables during a forward pass (step 504). A forward pass is traversing the call graph in a reverse depth-first or top down order. Once information is collected, the mechanism of the present invention analyzes the collected information at the end of the forward pass after all nodes of the call graph are traversed (step 506).

Finally, the mechanism of the present invention modifies the intermediate representation of the code being compiled during a backward pass (step 508). A backward pass is traversing the call graph in a depth-first or bottom up order. The process then terminates thereafter. By using a two-pass analysis, redundant computations are avoided by performing incremental updates of reference marking with a minimal number of computations per procedure.

Figure 6A:
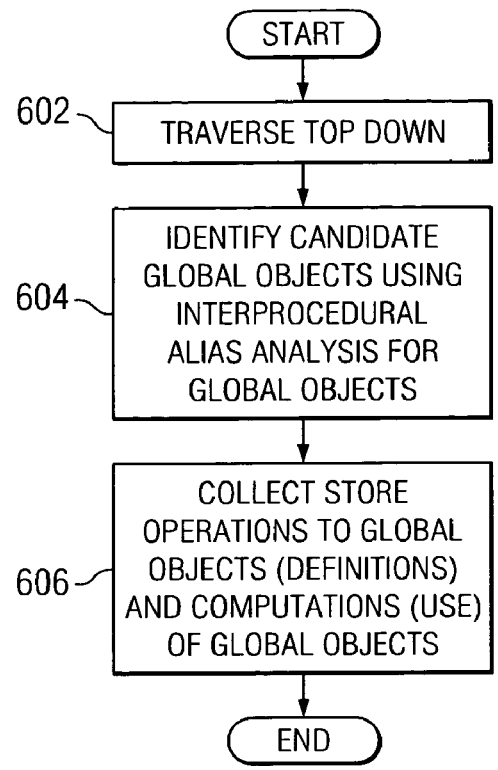
FIG. 6A is a flowchart of a process for collecting information during a forward pass in accordance with a preferred embodiment of the present invention.

Turning now to FIG. 6A, a flowchart of a process for collecting information during a forward pass is depicted in accordance with a preferred embodiment of the present invention. This process describes step 504 in FIG. 5 in further detail. As depicted in FIG. 6A, the process begins when the mechanism of the present invention traverses in reverse depth-first or top down order (step 602) of the intermediate representation generated by the compiler.

Next, the mechanism of the present invention uses inter-procedural alias analysis for global objects to identify candidate global objects (step 604). After candidate global objects are identified, the mechanism of the present invention collects store operations to global objects and computations of global objects (step 606). The computations of global objects are collected in a use list and the store operations to global variables are collected in a def list. Once the use list and the def list are generated, the process terminates thereafter.

Figure 6B:
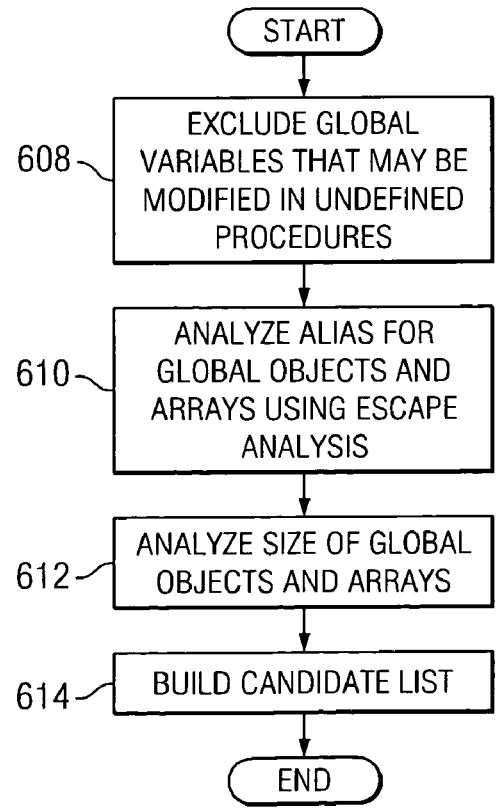
FIG. 6B is a flowchart of a process for identifying candidate global objects using inter-procedural alias analysis in accordance with a preferred embodiment of the present invention.

Turning now to FIG. 6B, a flowchart of a process for identifying candidate global objects using inter-procedural alias analysis is depicted in accordance with a preferred embodiment of the present invention. This process describes step 604 in FIG. 6A in further detail. As depicted in FIG. 6B, the process begins when the mechanism of the present invention excludes global variables that may be modified in the undefined procedure (step 608).

A defined procedure is a procedure that has a corresponding intermediate representation. If an intermediate representation for a procedure is not available, the procedure is identified as an undefined procedure. An example of an undefined procedure includes a procedure of which the assembler code is linked to the compiled code. Global variables in undefined procedures are excluded, because it is impossible to perform pre-computations in such procedures.

Next, the mechanism of the present invention analyzes the alias for global dynamic objects and arrays using escape analysis (step 610). A global object may be a candidate if aliases of the global object may be determined. Then, the mechanism of the present invention analyzes the size of global dynamic objects and arrays (step 612). The size of global objects or arrays may be obtained through static program data flow analysis or runtime profile information. A global object may be a candidate if the size is large. Finally, a list of candidate global objects is built by the mechanism of the present invention (step 614) and the process terminates thereafter.

Figure 6C:
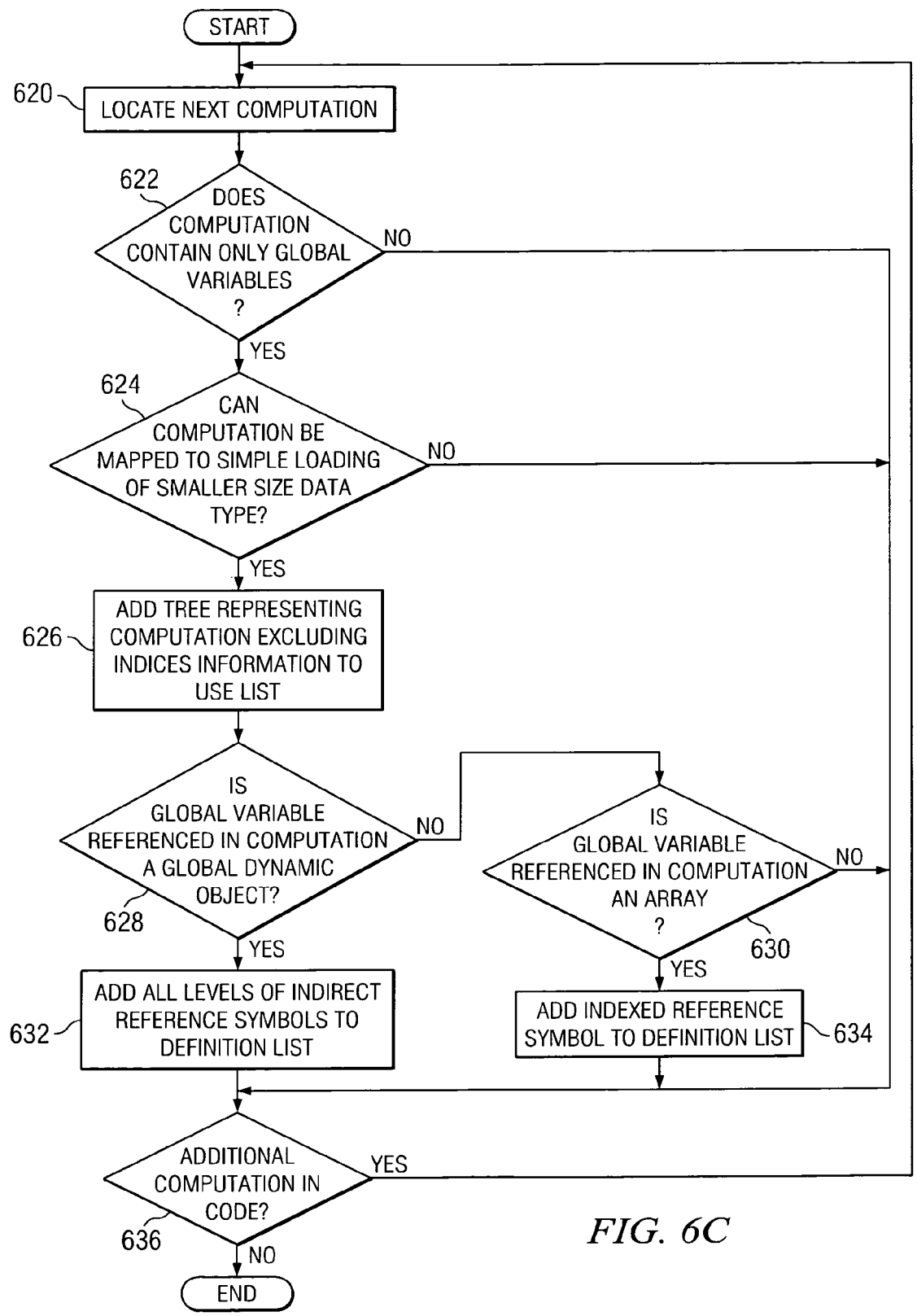
FIG. 6C is a flowchart of a process for collecting store operations to global objects and computations of global objects in accordance with a preferred embodiment of the present invention.

Turning next to FIG. 6C, a flowchart of a process for collecting store operations to global objects and computations of global objects is depicted in accordance with a preferred embodiment of the present invention. This process describes step 606 in FIG. 6A in further detail.

As depicted in FIG. 6C, the process begins when the mechanism of the present invention locates the next computation (step 620). Next, the mechanism of the present invention determines whether the computation contains only global variables (step 622). In this case, the indices of referenced global variables can contain local variables. If the computation does not contain only global variables, the computation may not be a potential candidate and the process continues to step 636.

If the computation contains only global variables, the mechanism of the present invention determines whether the computation can be mapped to simple loading of a smaller size data type (step 624). This step is described in further detail in FIG. 6D. If the computation cannot be mapped to simple loading of a smaller size data type, the process continues to step 636. If the computation can be mapped to simple loading of smaller size data type, the mechanism of the present invention adds the tree representing the computation excluding indices to the use list (step 626), since the indices are not needed.

After the tree representing the computation is added, the mechanism of the present invention determines whether the global variable referenced in the computation is a global dynamic object (step 628). If the global variable is a global dynamic object, the mechanism of the present invention adds not only the base object, but also all levels of indirect reference symbols to the def list (step 632) and the process continues to step 636.

If the global variable is not a global dynamic object, a determination is then made by the mechanism of the present invention as to whether the global variable is a global array (step 630). If the global variable is a global array, the mechanism of the present invention adds the indexed reference symbol to the def list (step 634) and the process continues to step 636. Otherwise, the process also continues to step 636.

At step 636, a determination is made by the mechanism of the present invention as to whether additional computation exists in the source program. If additional computation exists, the process returns to step 620 to retrieve the next computation. Otherwise, the process terminates thereafter.

Figure 6D:
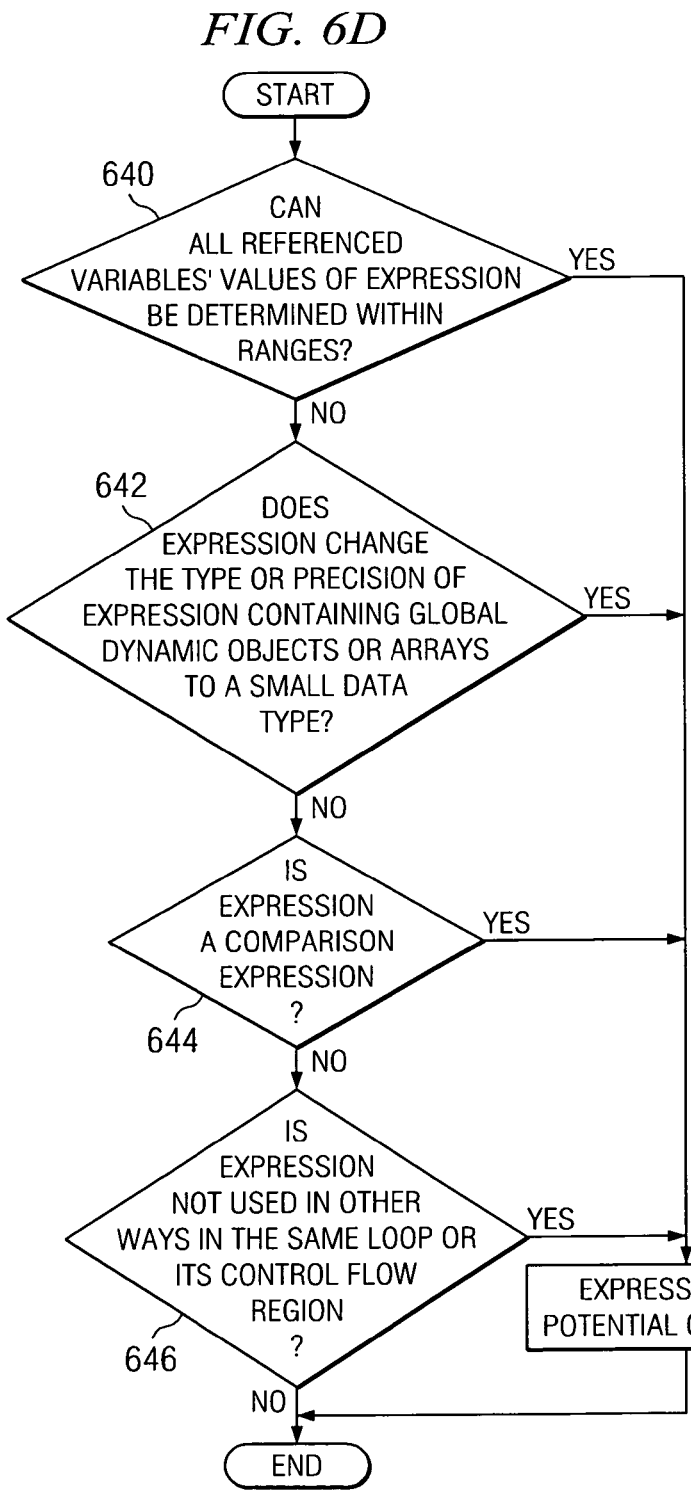
FIG. 6D is a flowchart of a process for determining whether a computation can be mapped to simple loading of smaller data type in accordance with a preferred embodiment of the present invention.

Turning next to FIG. 6D, a flowchart of a process for determining whether a computation can be mapped to simple loading of smaller data type is depicted in accordance with a preferred embodiment of the present invention. This process describes step 624 in FIG. 6C in further detail. As depicted in FIG. 6D, the process begins when the mechanism of the present invention determines whether all reference variables' values of an expression can be determined within ranges (step 640). The mechanism of the present invention gathers range information for global objects by performing inter-procedural range analysis using static program data flow analysis or runtime profile information.

If all referenced variables' values of an expression can be determined within ranges, a smaller data type can be used to store the range of value of the computation and the process continues to step 650. Otherwise, the mechanism of the present invention determines whether the computation changes the type or precision of an expression containing global dynamic objects or global arrays to a smaller data type, which is a conversion expression (step 642). A conversion expression changes the data type of a variable to a smaller data type, for example, from a double to an integer. A conversion expression may be reduced to the size of a converted type. If the expression is a conversion expression that changes the type of the expression to a smaller data type, the expression can be a candidate for object compression and the process continues to step 650.

However, if the expression is not a conversion expression that changes the type of expression to a smaller data type, the mechanism of the present invention determines whether the expression is a comparison expression (step 644). A comparison expression is an expression that evaluates to a value of either 0 or 1. A comparison expression may reduce global object size to a single bit or a byte depending on the architecture.

If the expression is a comparison expression, the process continues to step 650. Otherwise, the mechanism of the present invention determines whether the expression is not used in other ways in the same loop or its control flow region (step 646). In this case, the expression is self-contained. If the expression is not used in other ways in the same loop or its control flow region, the process continues to step 650. Otherwise, the process terminates thereafter.

At step 650, the expression is identified as a potential candidate and can be mapped to the simple loading of a smaller size data type and the process terminates thereafter.

Figure 7A:
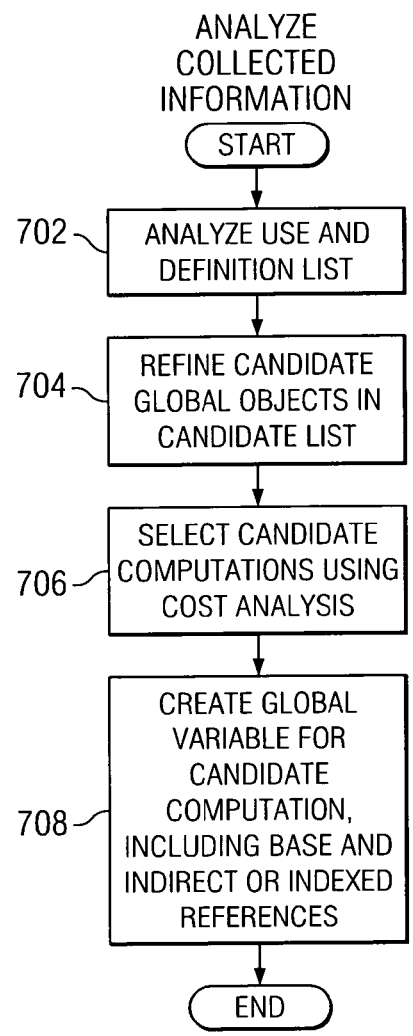
FIG. 7A is a flowchart of a process for analyzing collected information in accordance with a preferred embodiment of the present invention.

Turning now to FIG. 7A, a flowchart of a process for analyzing collected information is depicted in accordance with a preferred embodiment of the present invention. This process describes step 506 in FIG. 5 in further detail. As depicted in FIG. 7A, the process begins when the mechanism of the present invention analyzes the use list and def list that are generated using processes in FIGS. 6B, 6C and 6D (step 702). Next, the mechanism of the present invention refines candidate global objects using finalized alias information (step 704).

Once candidate global objects are refined, the mechanism of the present invention selects candidate computations using cost analysis (step 706). Once candidate computations are selected, the mechanism of the present invention creates new global variables for candidate computations (step 708). The new global variables are created including base symbols and indirect or indexed reference symbols. Thus, the process terminates thereafter.

Figure 7B:
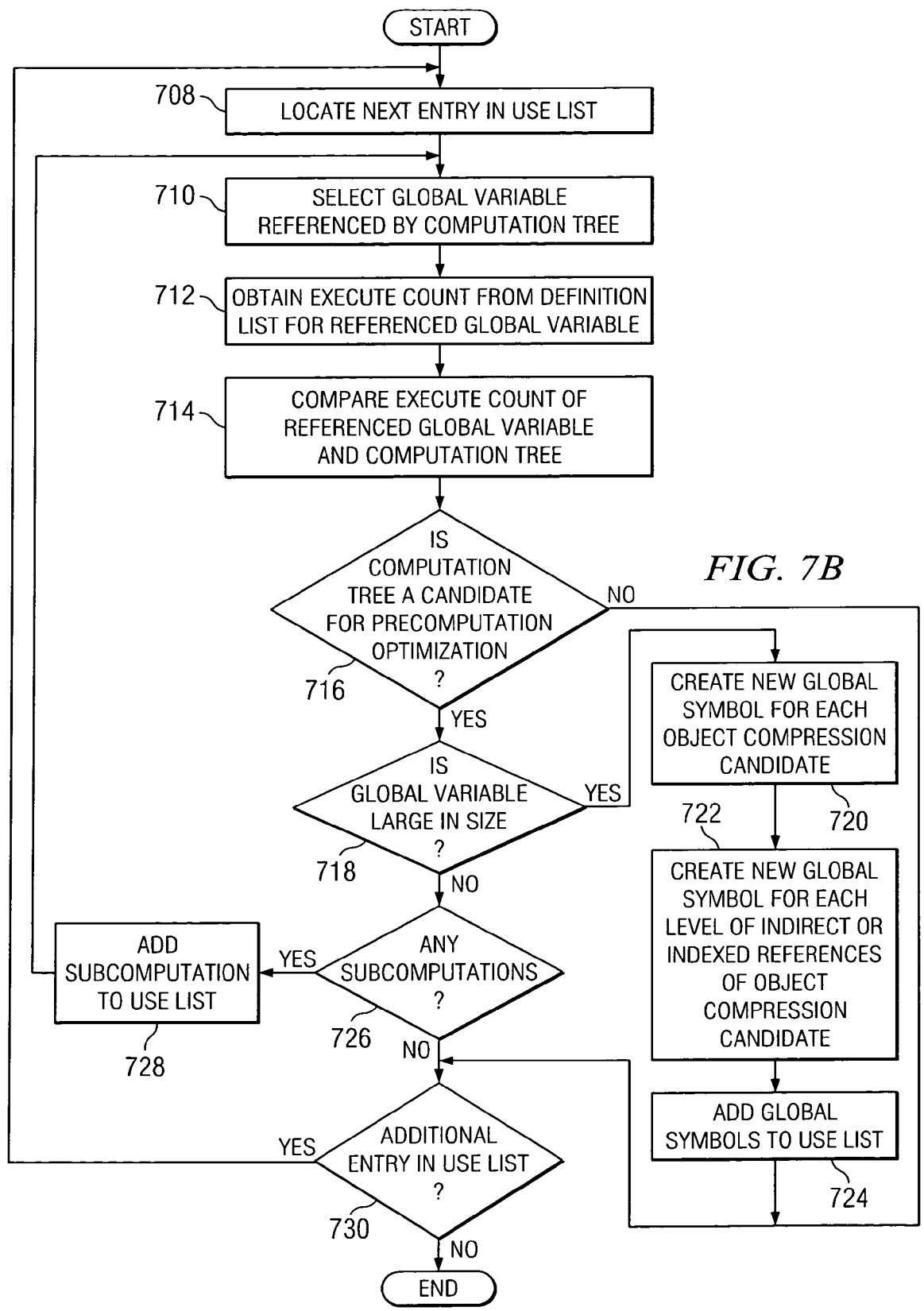
FIG. 7B is a flowchart of a process for selecting candidate computations for strength reduction based on cost analysis and creating global variable for candidate computations in accordance with a preferred embodiment of the present invention.

Turning now to FIG. 7B, a flowchart of a process for selecting candidate computations for strength reduction based on cost analysis and creating global variable for candidate computations is depicted in accordance with a preferred embodiment of the present invention. This process describes steps 704 and 706 in FIG. 7A in further detail. As depicted in FIG. 7B, the process begins when the mechanism of the present invention locates the next entry in the use list (step 708). Next, the mechanism of the present invention selects a global variable that is referenced by the tree computation (step 710) and obtains the execution cost from the def list corresponding to the referenced global variable (step 712). For flow-insensitive analysis, the execution cost may be the execution count. For flow-sensitive analysis, the execution cost may be weights assigned for each global variable store. The weights are determined based on reaching-definition and reached-use information obtained from control flow and data flow analysis.

After the execution cost is obtained, the mechanism of the present invention compares the execution count of referenced global variables of tree computation (step 714) and determines whether the tree computation is a candidate for pre-computation optimization (step 716). This step includes determining if the total cost of pre-computation of the computation is much lower than the current computation cost.

If the tree computation is a candidate for pre-computation optimization, the mechanism of the present invention determines whether the global variable referenced in the computation is large in size (step 718). If the global variable is large in size, the mechanism of the present invention creates new global symbol for the computation (step 720) and a new global symbol for each level of indirect or indexed references in the computation (step 722). After the symbols are generated, the mechanism of the present invention adds the symbols to the use list (step 724). The process then continues to step 730.

Turning back to step 718, if the global variable is not large in size, the mechanism of the present invention determines whether the tree computation includes any sub-computation (step 726). If sub-computation exists, the mechanism of the present invention adds the sub-computation to the use list (step 728) and returns to step 710 to further analyze the sub-computation. If no sub-computation exists, the process continues to step 730.

At step 730, the mechanism of the present invention determines whether additional entries exist in the use list. If additional entries exist, the process returns to step 708 to obtain the next entry. Otherwise, the process terminates thereafter.

Turning now to FIG. 8A, a flowchart of a process for modifying intermediate representation of code during backward pass is depicted in accordance with a preferred embodiment of the present invention. This process describes step 508 in FIG. 5 in further detail. As depicted in FIG. 8A, the process begins when the mechanism of the present invention traverses in depth-first or bottom up order (step 802) of the intermediate representation generated by the compiler.

Next, the mechanism of the present invention inserts a store operation for each computation that references the global variable (step 804). The store operations are inserted at all of the global variable's definition points where the base symbol, its indirect or indexed reference symbol, or its alias symbols is defined in the whole program. Finally, the mechanism of the present invention replaces the candidate computation with the indirect reference of new global dynamic objects or the indexed reference of new global arrays (step 806). Thus, the process terminates thereafter.

Figure 8B:
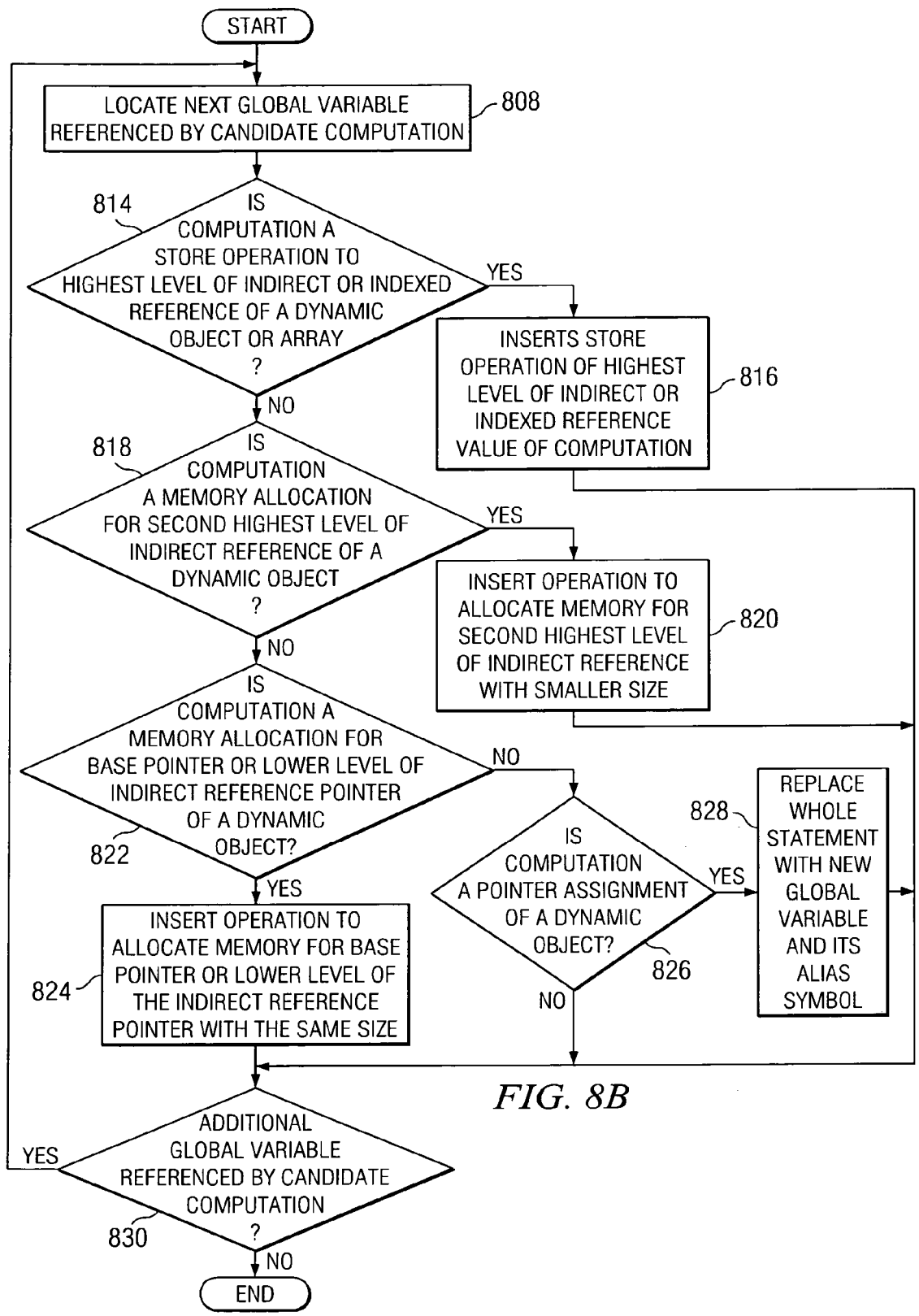
FIG. 8B is a flowchart of a process for inserting store operations for each computation referencing the global variable in accordance with a preferred embodiment of the present invention.

Turning now to FIG. 8B, a flowchart of a process for inserting store operations for each computation referencing the global variable is depicted in accordance with a preferred embodiment of the present invention. This process describes step 804 in FIG. 8A in further detail. As depicted in FIG. 8B, the process begins when the mechanism of the present invention locates the next global variable referenced by the candidate computation (step 808).

Next, the mechanism of the present invention determines whether the candidate computation is a store operation to the highest level of indirect or indexed references of a dynamic object or array (step 814). If the candidate computation is a store operation to the highest level of the indirect or indexed reference, the mechanism of the present invention inserts a store operation to the highest level of the indirect or indexed reference the value of the computation (step 816). The process then continues to step 830.

If the candidate computation is not a store operation to the highest level of the indirect or indexed reference, the mechanism of the present invention continues to determine whether the candidate computation is a memory allocation for the second highest level of the indirect reference of a dynamic object (step 818). If the candidate computation is a memory allocation for the second highest level of the indirect reference of a dynamic object, the mechanism of the present invention inserts a store operation to allocate memory for the second highest level of the indirect reference of the new dynamic object with a smaller size (step 820). If the highest level of the indirect reference is 1, the second highest level of the indirect reference is the base pointer. The process then continues to step 830.

Turning back to step 818, if the candidate computation is not a memory allocation for the second highest level of indirect reference of a dynamic object, the mechanism of the present invention determines whether the candidate computation is a memory allocation for the base pointer or the lower level of the indirect reference pointer of a dynamic object (step 822).

If the candidate computation is a memory allocation for the base pointer or the lower level of the indirect reference pointer of a dynamic object, the mechanism of the present invention inserts a store operation to allocate memory for base pointer or the lower level of the indirect reference pointer of the new dynamic object with the same size (step 824). The process then continues to step 830.

Otherwise, the mechanism of the present invention determines whether the candidate computation is a pointer assignment of a dynamic object (step 826). If the candidate computation is a pointer assignment of a dynamic object, the mechanism of the present invention inserts a store operation to the new global variable by replacing the whole assignment statement with the new global variable and its corresponding alias symbol (step 828). The process then continues to step 830. If the candidate computation is not a pointer assignment, the process also continues to step 830.

At step 830, the mechanism of the present invention determines whether additional global variable is referenced by candidate computation. If additional global variable is referenced by candidate computation, the process returns to step 808 to locate the next global variable referenced by candidate computation. Otherwise, the process terminates thereafter.

Turning now to FIG. 9, a diagram illustrating an exemplary software program prior to optimization using inter-procedural strength reduction is depicted in accordance with a preferred embodiment of the present invention. As depicted in FIG. 9, in this example implementation, source program 900 includes variable declarations 902, a bar procedure 904, and foo procedure 906.

Variable declarations 902 include two declarations, declarations of variables 'a' and 'b'. Variable 'a' is a global dynamic object of type pointer to float pointer. Variable 'b' is a two dimensional integer array with dimension of M×N.

Bar procedure 904 includes a store operation to variable 'a' 908, which allocates memory for variable 'a' with a size of M float pointers. Bar procedure 904 also includes a store operation to a dynamic array 'a[i]' 910, which allocates memory for variable a[i] with a size of N floats.

Procedure foo 906 includes two expressions, expressions 912 and 914. Expression 912 compares Fa(a[i][j]) 916 to 1. Fa 916 is an expression containing reference of a. Expression 914 is a modulo expression, which mod Fb(b[i][j]) 918 with 256 to convert the value of Fb 918 to the size of a byte.

During the forward pass, the mechanism of the present invention collects information not only of the base global objects, but its levels of the indirect or indexed reference. In this example, the def list includes entries for base symbol a, second highest level of the indirect reference a[ ], first highest level of indirect reference a[ ][ ], and the indexed reference b[ ][ ]. The relationship between the object's base symbol and its indirect or indexed references are also recorded.

On the other hand, the use list includes entries for tree expressions 912 and 914. Expression 912 is added to the use list, because Fa 916 is a comparison expression and is identified by the mechanism of the present invention as a candidate for object compression. Expression 914 is also added to the use list, because Fb 918 converts a value to the size of a byte, which is smaller in size than an integer. Therefore, expression 914 is also identified as a candidate for object compression. While the expressions are recorded in the use list, the indices information of the expression recorded is excluded from the entries stored in the use list.

After the def and use information is collected during the forward pass, the mechanism of the present invention analyzes the information and selects candidate computations for reduction in strength based on cost analysis. If the total cost of pre-computation of a computation is much lower than the current computation cost, the computation is selected as a candidate for optimization. In this example, if variables 'a' and 'b' are determined to be large in size and their execution count is much higher than the execution count of their definitions, expressions 912 and 914 are selected as candidate computation for optimization.

The mechanism of the present invention then creates new global variables for the two selected computations. The number of global variables created depends on the number of their levels of indirect or indexed reference in the computation. In this example, new global variables created are isra for global variable 'a', isra[ ] for second highest level of indirect reference a[ ], and isra[ ][ ] for first highest level of indirect reference a[ ][ ]. Similarly, isrb and isrb[ ][ ] are created for global variable b.

After new global variables are created, the mechanism of the present invention inserts store operations for each selected computation that references these two global variables. The mechanism of the present invention traverses the call graph in a bottom-up or depth-first order.

Turning now to FIG. 10, a diagram illustrating an exemplary software program after optimization using inter-procedural strength reduction is depicted in accordance with a preferred embodiment of the present invention. As depicted in FIG. 10, in this example implementation, optimized program 1000 is similar to source program 900 in FIG. 9, which includes declarations 1002, bar procedure 1004, and foo procedure 1006. However, the mechanism of the present invention inserted two store operations in bar procedure 1004 for each of the variables declared in declarations 1002.

One of the variables declared in declarations 1002 is declaration 1008 or 'bool isra', which declares new global variable created for variable 'a' with a type pointer to Boolean pointer. As described in FIG. 9, since Fa is a comparison expression that can be reduced to a size of 1 bit or 1 byte, expression 912** can be reduced to a Boolean expression.

Another variable declared in declarations 1002 is declaration 1010 or 'char isrb[M][N]', which declares new global array created for variable 'b' with a type of char and dimension of M×N. As described in FIG. 9, since expression 914 converts the value of Fb to size of a byte and a char type also has a size of a byte, expression 914 can be optimized by using smaller data type.

Bar procedure 1004 includes two inserted store operations 1014 and 1016. Operation 1014 allocates memory for new global variable 'isra' with a size of M Boolean pointers. The second inserted store operation, operation 1016, is inserted to allocate memory for new global symbol created 'isra[ ]' with a size of N Booleans. Operation 1016 allocates memory with a smaller size, because isra[ ] is the second highest level of indirect reference for variable a.

After store operations are inserted, the mechanism of the present invention replaces candidate computations that are selected with the indirect reference of new global objects or indexed reference of new global arrays. In this example, expression 912 in FIG. 9 is replaced with isra 1018, which is the first highest level of indirect reference for variable 'a' and expression 914 is replaced with isrb 1020, which is the indexed reference for variable 'b'.

Turning now to FIG. 11, a diagram illustrating an exemplary software program after further optimization using inter-procedural strength reduction is depicted in accordance with a preferred embodiment of the present invention. As depicted in FIG. 11, program 1100 is similar to optimized program 1000 in FIG. 10, except that foo procedure 1102 is further optimized with elimination of if branch statement.

In summary, the present invention provides a method, apparatus and computer instructions for improving data cache performance using inter-procedural strength reduction of global objects. The present invention generates and updates global variables when the computation in a program changes and replaces computations in the loop with indirect or indexed references of the new global variables. In this way, usage pattern of global objects are analyzed inter-procedurally and global objects are remapped to smaller size objects, such that more cache efficient programs may be generated and data cache performance can be improved.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-RCMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for improving data cache performance, the method comprising:
collecting information of at least one global object in a software program during a forward pass to form collected information, wherein the forward pass determines whether the at least one global object is mapped to a smaller size global object relative to the at least one global object, wherein the at least one global object is one of the group consisting of a global dynamic object and a global array, and wherein the collecting comprises:
analyzing alias information of the at least one global object using escape analysis;
identifying at least one candidate global object for optimization; and
collecting at least one computation operating on the at least one candidate global object and at least one store operation modifying the at least one candidate global object;

analyzing the collected information after the forward pass to form analyzed information, wherein analyzing the collected information comprises:

finalizing the at least one candidate global object based on finalized alias information;

selecting at least one candidate computation from the collected at least one computation based on which of the collected at least one computation has a lower pre-computation cost than a current computation cost to form a selected at least one candidate computation; and creating at least one global variable for the selected at least one candidate computation, wherein the selected at least one candidate computation and the at least one global variable are part of the analyzed information; and modifying an intermediate representation of the software program during a backward pass using the analyzed information, wherein modifying the intermediate representation comprises:

replacing the selected at least one candidate computation by one of a group consisting of indirect references and indexed references of the at least one global variable; and inserting a store operation for each of the at least one candidate global object at all definition points of the at least one candidate global object in the software program.

2. A data processing system for improving data cache performance, the data processing system comprising:

a system bus;

a communications system connected to the system bus;

a memory connected to the system bus, wherein the memory includes computer usable code; and a processing unit connected to the system bus, wherein the processing unit executes the computer usable code to:

collect information of at least one global object in a software program during a forward pass to form collected information, wherein the forward pass determines whether the at least one global object is mapped to a smaller size global object relative to the at least one global object, wherein the at least one global object is one of the group consisting of a global dynamic object and a global array, and wherein the collecting comprises:

analyze alias information of the at least one global object using escape analysis;

identify at least one candidate global object for optimization; and collect at least one computation operating on the at least one candidate global object and at least one store operation modifying the at least one candidate global object;

analyze the collected information after the forward pass to form analyzed information, wherein analyzing the collected information comprises:

finalize the at least one candidate global object based on finalized alias information;

select at least one candidate computation from the collected at least one computation based on which of the collected at least one computation has a lower pre-computation cost than a current computation cost to form a selected at least one candidate computation; and create at least one global variable for the selected at least one candidate computation, wherein the selected at least one candidate computation and the at least one global variable are part of the analyzed information; and modify an intermediate representation of the software program during a backward pass using the analyzed information, wherein modifying the intermediate representation comprises:

replace the selected at least one candidate computation by one of a group consisting of indirect references and indexed references of the at least one global variable; and insert a store operation for each of the at least one candidate global object at all definition points of the at least one candidate global object in the software program.

3. A computer program product in a computer recordable medium for improving data cache performance, the computer program product comprising:

instructions for collecting information of at least one global object in a software program during a forward pass to form collected information, wherein the forward pass determines whether the at least one global object is mapped to a smaller size global object relative to the at least one global object, wherein the at least one global object is one of the group consisting of a global dynamic object and a global array, and wherein the collecting comprises:

instructions for analyzing alias information of the at least one global object using escape analysis;

instructions for identifying at least one candidate global object for optimization; and instructions for collecting at least one computation operating on the at least one candidate global object and at least one store operation modifying the at least one candidate global object;

instructions for analyzing the collected information after the forward pass to form analyzed information, wherein analyzing the collected information comprises:

instructions for finalizing the at least one candidate global object based on finalized alias information;

instructions for selecting at least one candidate computation from the collected at least one computation based on which of the collected at least one computation has a lower pre-computation cost than a current computation cost to form a selected at least one candidate computation; and instructions for creating at least one global variable for the selected at least one candidate computation, wherein the selected at least one candidate computation and the at least one global variable are part of the analyzed information; and instructions for modifying an intermediate representation of the software program during a backward pass using the analyzed information, wherein modifying the intermediate representation comprises:

instructions for replacing the selected at least one candidate computation by one of a group consisting of indirect references and indexed references of the at least one global variable; and instructions for inserting a store operation for each of the at least one candidate global object at all definition points of the at least one candidate global object in the software program.

\* \* \* \* \*